United States Patent [19]
Fontanazzi et al.

[11] Patent Number: 6,085,496
[45] Date of Patent: Jul. 11, 2000

[54] PACKAGING UNIT FOR CONTINUOUSLY PRODUCING SEALED PACKAGES, CONTAINING POURABLE FOOD PRODUCTS, FROM A TUBE OF PACKAGING MATERIAL

[75] Inventors: Paolo Fontanazzi, Modena, Italy; Felix Dunge, Gothenburg; Per Gustafsson, Bjarred, both of Sweden

[73] Assignee: Tetra Laval Holdings & Finance S.A., Pully, Switzerland

[21] Appl. No.: 09/098,750

[22] Filed: Jun. 17, 1998

[30] Foreign Application Priority Data

Jun. 27, 1997 [EP] European Pat. Off. .............. 97830316

[51] Int. Cl.[7] ...................................................... B65B 9/06
[52] U.S. Cl. ................................................. 53/551; 53/552
[58] Field of Search ................................. 53/551, 552, 75; 83/698.61; 493/302

[56] References Cited

U.S. PATENT DOCUMENTS

| | | |
|---|---|---|
| 565,186 | 8/1896 | Taylor ................................... 83/698.61 |
| 2,738,631 | 3/1956 | Järund . |
| 2,741,079 | 4/1956 | Rausing . |
| 2,784,540 | 3/1957 | Jarund ................................... 83/698.61 |
| 3,247,746 | 4/1966 | Nystrand .............................. 83/698.61 |
| 3,300,944 | 1/1967 | Thesing . |
| 3,320,718 | 5/1967 | Thesing . |
| 3,388,525 | 6/1968 | Thesing et al. . |
| 3,444,792 | 5/1969 | Thesing et al. . |
| 3,555,652 | 1/1971 | Ignell . |
| 4,074,961 | 2/1978 | Reil . |
| 4,240,313 | 12/1980 | Gillespie .............................. 83/698.61 |
| 4,387,547 | 6/1983 | Reil . |
| 4,949,615 | 8/1990 | Jordan . |
| 5,155,980 | 10/1992 | Mansson et al. . |
| 5,590,511 | 1/1997 | Morrison .................................. 53/552 |
| 5,669,278 | 9/1997 | Metzner .............................. 83/699.61 |

FOREIGN PATENT DOCUMENTS

| | | |
|---|---|---|
| 4116154 | 11/1992 | Germany . |
| 878 667 | 11/1981 | Russian Federation . |

*Primary Examiner*—John Sipos
*Attorney, Agent, or Firm*—Burns, Doane, Swecker & Mathis, L.L.P.

[57] ABSTRACT

A packaging unit (1) for continuously producing aseptic sealed packages (2), containing a pourable food product, from a tube (14) of packaging material filled with the food product and fed along a vertical supply path (A); the unit (1) has a first and second chain conveyor (10, 11) respectively having a number of jaws (12) and a number of counter-jaws (13), which interact with the tube (14) to grip and heat-seal the tube at successive cross sections and so define a strip (25) of packages (2) connected to one another by respective transverse sealing bands (26); and the unit (1) also has a first and a second cutting member (54, 55) located beneath the conveyors (10, 11) and symmetrically on opposite sides of the supply path (A), rotating synchronously and in opposite directions about respective axes of rotation (G, H) crosswise to the supply path (A), and cooperating with the strip (25) of packages (2) to cut the strip (25) along the sealing bands (26) and draw the packages (2) away from the chain conveyors (10, 11).

9 Claims, 6 Drawing Sheets

PACKAGING UNIT FOR CONTINUOUSLY PRODUCING SEALED PACKAGES, CONTAINING POURABLE FOOD PRODUCTS, FROM A TUBE OF PACKAGING MATERIAL

The present invention relates to a packaging unit for continuously producing aseptic sealed packages, containing pourable food products, from a tube of packaging material.

More specifically, the packaging unit according to the present invention provides for producing substantially parallelepiped aseptic sealed packages.

Many pourable food products, such as fruit juice, pasteurized or UHT (ultra-high-temperature treated) milk, wine, tomato sauce, etc., are sold in packages made of sterilized packaging material.

A typical example of such a package is the parallelepiped packaging container for liquid or pourable food products known by the name of Tetra Brik Aseptic (registered trademark), which is formed by folding and sealing a strip-rolled packaging material. The rolled packaging material comprises layers of fibrous material, e.g. paper, covered on both sides with thermoplastic material, e.g. polyethylene; and the side of the packaging material eventually contacting the food product in the package also comprises a layer of barrier material, e.g. an aluminium sheet, in turn covered with a layer of thermoplastic material.

As is known, packages of the above type are produced on fully automatic packaging units, on which a continuous tube is formed from the packaging material supplied in strip form. The strip of packaging material is sterilized on the packaging unit, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections at which it is then cut into pillow-pack packets, which are subsequently folded mechanically to form final, e.g. substantially parallelepiped, packages.

Continuous packaging units of the above type are known, e.g. from prior U.S. Pat. No. Re 33 467, which comprise a first and a second chain conveyor defining respective endless paths and respectively fitted with a number of jaws and counter-jaws. The two paths comprise respective work branches substantially facing and parallel to each other, and between which the tube of packaging material is fed, so that the jaws on the first conveyor cooperate, along said work branches of the respective paths, with corresponding counter-jaws on the second conveyor to grip and heat-seal the tube at a number of successive cross sections and so form a continuous strip of packages connected to one another by respective transverse sealing bands.

Units of the above type also comprise a number of cutting elements fitted to respective jaws, movable with respect to the jaws in a direction crosswise to the strip of packages, and cooperating with the strip to cut it along the respective sealing bands to detach the packages.

To safely ensure operation of the cutting elements following formation of the transverse sealing bands by the jaws and counter-jaws, a control device is required to control the movement of the cutting elements, and which normally comprises at least one cam located along the path defined by the first conveyor, and interacting with the cutting elements to move them with respect to the jaws at a final portion of the respective work branch and downstream from the portion of the work branch along which the strip of packages is sealed.

As such, each jaw, in conjunction with the corresponding counter-jaw, performs numerous successive operations, from gripping the tube of packaging material, to heat-sealing the tube and, finally, cutting the heat-sealed strip of packages, so that the jaws and counter-jaws are fairly complex in design, and require a precise operation control system. More specifically, as stated, they require a control device for activating the cutting elements at a predetermined point in the work cycle.

Moreover, when changing the cutting elements—a relatively large number of which (one for each jaw) are provided on the first conveyor—the jaws must be removed entirely, thus resulting in a good deal of painstaking, time-consuming work on account of the complex design of the jaws.

Finally, on known packaging units, a badly formed package may remain jammed inside the respective jaw or counter-jaw on one of the chain conveyors. In which case, the jammed package is fed back by the conveyor to the start of the respective work branch, where it becomes jammed between the conveyor and the tube of packaging material, thus resulting in tearing of the tube and loss of the product inside it. At best, the unit must therefore be stopped to remove the jammed package, and then restarted, thus resulting in a loss of production. Frequently, however, the jamming of a package between the chain conveyor and the tube of packaging material has far more serious consequences, such as damage to the chain conveyor components or associated devices, such as the jaws or counter-jaws, heat-sealing members, etc., all of which must therefore be replaced or repaired at the expense of considerable downtime.

Also to be taken into account is the problem of preserving the product for packaging, which, though preservable for several months once it is packaged aseptically, may only be preserved for a few hours prior to packaging. As such, to the expense incurred due to loss of production and repair of the packaging unit, must be added the cost of the rejected product (thousands of liters of high-market-value product).

It is an object of the present invention to provide a packaging unit for continuously producing aseptic sealed packages containing pourable food products, and designed to eliminate the aforementioned drawbacks typically associated with known units.

According to the present invention, there is provided a packaging unit for continuously producing aseptic sealed packages, containing a pourable food product, from a tube made of heat-seal packaging material in sheet form and fed along a vertical supply path; said tube being filled with said food product; and said unit comprising:

a first chain conveyor having a number of jaws, and defining an endless first path along which said jaws are fed;

a second chain conveyor having a number of counter-jaws, and defining an endless second path along which said counter-jaws are fed;

said first and said second path comprising respective work portions adjacent to said supply path of the tube of packaging material, and extending symmetrically on opposite sides of said supply path, so that said jaws on said first conveyor cooperate with respective said counter-jaws on said second conveyor, along at least part of the respective said work portions, to grip said tube at respective equally spaced cross sections;

said unit also comprising heating means fitted to at least said jaws and cooperating with said tube to heat-seal the tube at said cross sections and define a strip of packages connected to one another by respective transverse sealing bands; and cutting means for cutting said strip of packages along said sealing bands and so detaching said packages;

characterized in that said cutting means comprise a first and a second cutting member located beneath said conveyors along said supply path and on opposite sides of the supply path, rotating synchronously and in opposite directions about a respective first and second axis of rotation crosswise to said supply path, and cooperating with said strip of packages to cut the strip of packages along said sealing bands and draw said packages away from said chain conveyors.

A preferred, non-limiting embodiment of the present invention will be described by way of example with reference to the accompanying drawings, in which.

Figure 1:
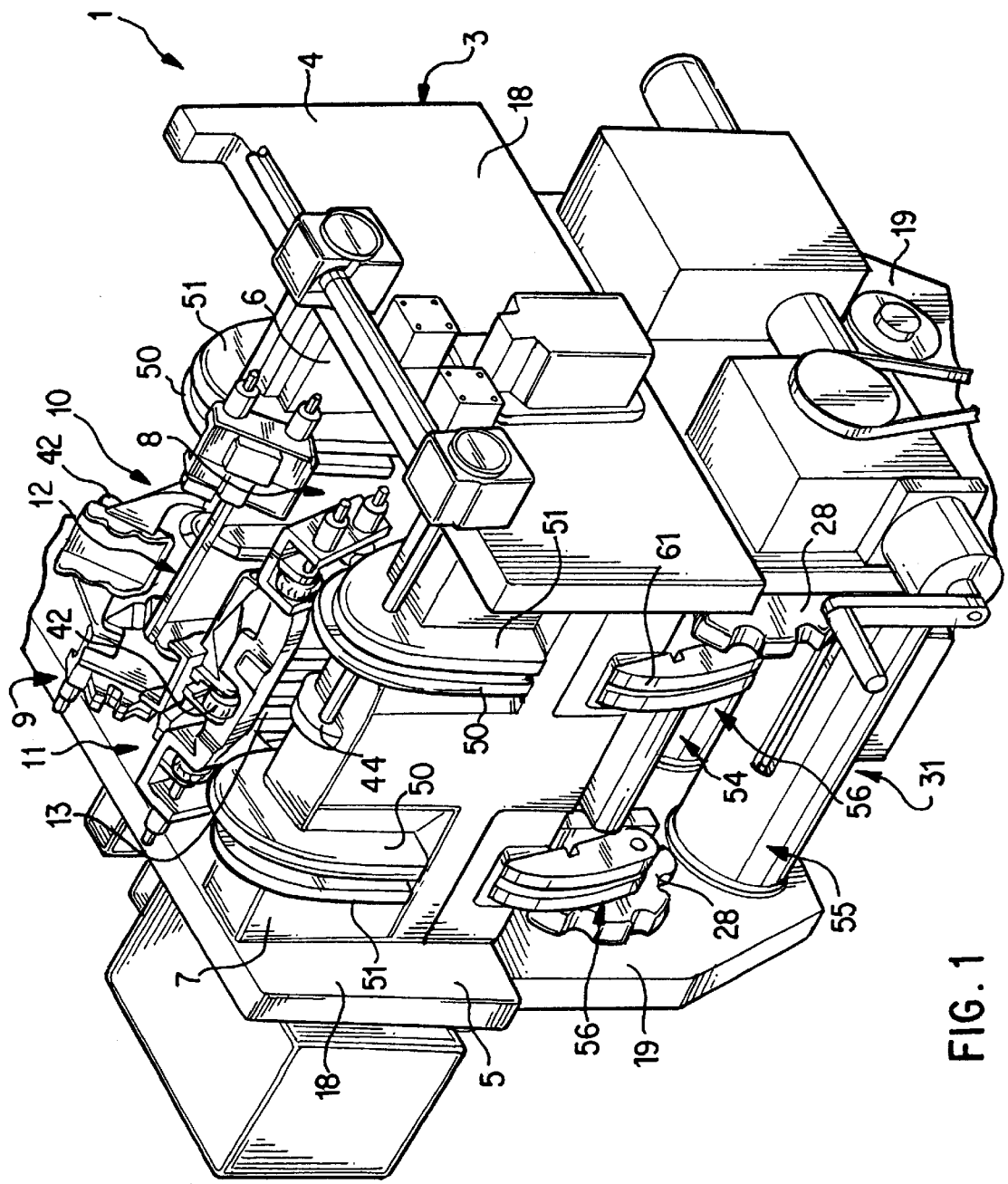
FIG. 1 shows a view in perspective, with parts removed for clarity, of a packaging unit in accordance with the present invention.

Number 1 in FIG. 1 indicates a packaging unit for continuously producing, from a tube 14 of packaging material, aseptic sealed packages 2 (FIGS. 2, 4) containing a pourable food product, such as pasteurized or UHT milk, fruit juice, wine, etc.

Tube 14 is formed in known manner upstream from unit 1 by longitudinally folding and sealing a strip of heat-seal material, and is filled with the sterilized or sterile-processed food product for packaging. Unit 1 comprises a frame 3 defined by two side walls 4, 5 and by two parallel transverse walls 6, 7 fitted rigidly between side walls 4, 5 and defining, with side walls 4, 5, an opening 8; a forming assembly 9 fitted to frame 3 and interacting with tube 14, fed along a vertical path A through opening 8, to convert tube 14 into a vertical strip 25 of packages 2 connected to one another by respective transverse sealing bands 26; and a cutting assembly 31 located beneath forming assembly 9 along path A, and cooperating with strip 25 of packages 2 to cut it along bands 26 and so detach packages 2.

More specifically, bands 26 (FIGS. 2, 4) are substantially flat and rectangular, with the longer sides extending in a direction crosswise to path A and to side walls 4, 5 of frame 3, and are substantially parallel to walls 6, 7.

Each side wall 4, 5 comprises a top plate 18 and a bottom plate 19 connected to each other removably by a number of screws 41.

Figure 2:
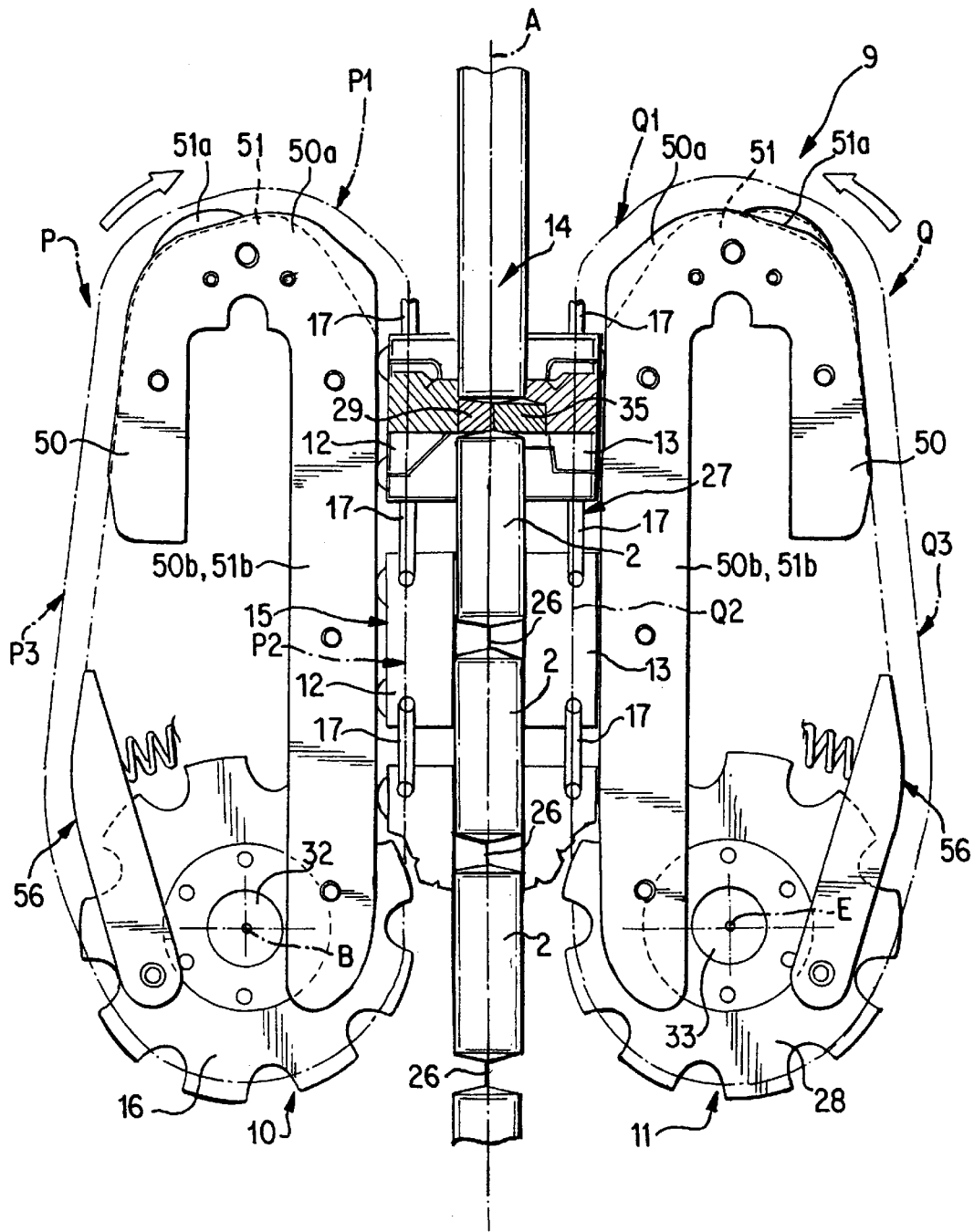
FIG. 2 shows a larger-scale, schematic side view, with parts removed for clarity, of a forming assembly of the FIG. 1 unit.

With reference to FIGS. 1 and 2, forming assembly 9 comprises two chain conveyors 10, 11, which are fitted to frame 3, respectively comprise jaws 12 (only one shown) and counter-jaws 13 (only one shown) cooperating with each other to interact with tube 14, and define respective endless paths P and Q along which jaws 12 and counter-jaws 13 are fed (FIG. 2), and which respectively extend about walls 6 and 7 of frame 3.

Conveyor 10 comprises an articulated chain 15 extending along path P; and two drive wheels 16 meshing with and on both sides of chain 15 at the bottom end of path P, and fitted to a shaft 32 (FIGS. 2, 3, 4), which in turn is fitted through plates 19 of side walls 4, 5, rotates about a respective axis B perpendicular to plates 19, and is activated by a control assembly (not forming part of the present invention and therefore not shown) of unit 1.

Jaws 12 are an integral part of and define alternate links of chain 15, and are connected to one another in articulated manner by pairs of links 17.

More specifically, each jaw 12 (FIGS. 5, 6) comprises an elongated main body 20 extending in a direction perpendicular to path A and parallel to wall 6, and having respective end projections 21 and 22, each of which has a projecting first and second pin 23, 24 spaced with respect to each other and having respective axes C, D parallel to the main dimension of body 20. Links 17 pivot on pins 23, 24 of jaws 12 so as to connect pins 23 of one jaw 12 to pins 24 of the adjacent jaw.

Similarly, conveyor 11 comprises an articulated chain 27 extending along path Q; and two drive wheels 28 meshing with chain 27 at the bottom end of path Q, and fitted to a shaft 33, which in turn is fitted through plates 19 of side walls 4, 5, rotates about a respective axis E parallel to axis B, and is activated by said control assembly of unit 1.

Chain 27 is defined by a number of counter-jaws 13 connected in articulated manner to one another and only described in detail insofar as they differ from jaws 12, and using the same numbering system for any parts similar or corresponding to those described in connection with jaws 12. Briefly, each counter-jaw 13 comprises a main body 20 having pairs of end pins 23, 24 about which links 17 pivot to connect adjacent pairs of counter-jaws 13.

Each jaw 12 comprises an induction heating element 29 fitted to main body 20 in a direction crosswise to path A of tube 14, and which in turn comprises a pair of straight, parallel active surfaces 30, and is supplied electrically by a pair of contact brushes 34 cooperating in sliding manner, in use, with a supply bar (not shown) fitted to frame 3 and extending in the region of path P inside opening 8.

As opposed to a heating element 29, each counter-jaw 13 comprises a pressure bar 35 (FIG. 6), in turn comprising a pair of relatively flexible bands 36 of elastomeric material on the front surface 46 facing the corresponding jaw 12 in use. Heating element 29 of each jaw 12 and pressure bar 35 of the corresponding counter-jaw 13 cooperate with each other to grip and heat-seal tube 14 at a cross section of tube 14 defining a respective band 26 of strip 25 of packages 2.

More specifically, active surfaces 30 of each jaw 12 and bands 36 of elastomeric material of each counter-jaw 13 cooperate with each other to heat-seal band 26 along two spaced sealing lines (not shown) adjacent to the respective packages 2 connected by band 26.

Bar 35 is connected to main body 20 by a pair of supporting assemblies 47—not forming part of the present invention and therefore not described in detail—which flex in the direction of the gripping pressure exchanged, in use, between counter-jaw 13 and corresponding jaw 12.

With reference to FIGS. 1, 2, 5 and 6, the movement of jaws 12 is controlled by two pairs of cams 50, 51 fitted to wall 6 of frame 3 and cooperating with respective pairs of rollers 52, 53 fitted to jaws 12; and, similarly, the movement of counter-jaws 13 is controlled by a further two pairs of cams 50, 51 fitted to wall 7 of frame 3, substantially symmetrical with the corresponding cams 50, 51 on wall 6 with respect to a plane through path A and crosswise to side walls, 4, 5, and cooperating with respective pairs of rollers 52, 53 fitted to counter-jaws 13.

Cams 50, 51 comprise respective substantially U-shaped portions 50a, 51a extending about the top edge of respective walls 6, 7 to define, for respective chains 15, 27 of conveyors 10, 11, a transmission opposite respective drive wheels 16 and 28; and respective portions 50b, 51b extending vertically along respective walls 6, 7, inside opening 8. Portions 50a, 51a (FIG. 2) define portions P1, Q1 of paths P, Q, along which jaws 12 and counter-jaws 13 approach and contact tube 14 of packaging material; and portions 50b, 51b define facing, parallel portions P2, Q2 of paths P, Q, along which jaws 12 and counter-jaws 13 are maintained contacting under pressure to form the seals defining packages 2.

Cams 50, 51 release respective chains 15, 27 at respective portions P3, Q3 of paths P and Q downstream from respective drive wheels 16, 28.

Along portions P3, Q3, chains 15, 27 cooperate with respective pairs of tensioners 56 for so tensioning chains 15, 27 as to ensure rollers 52, 53 of jaws 12 and counter-jaws 13 are maintained contacting relative cams 50, 51.

Figure 5:
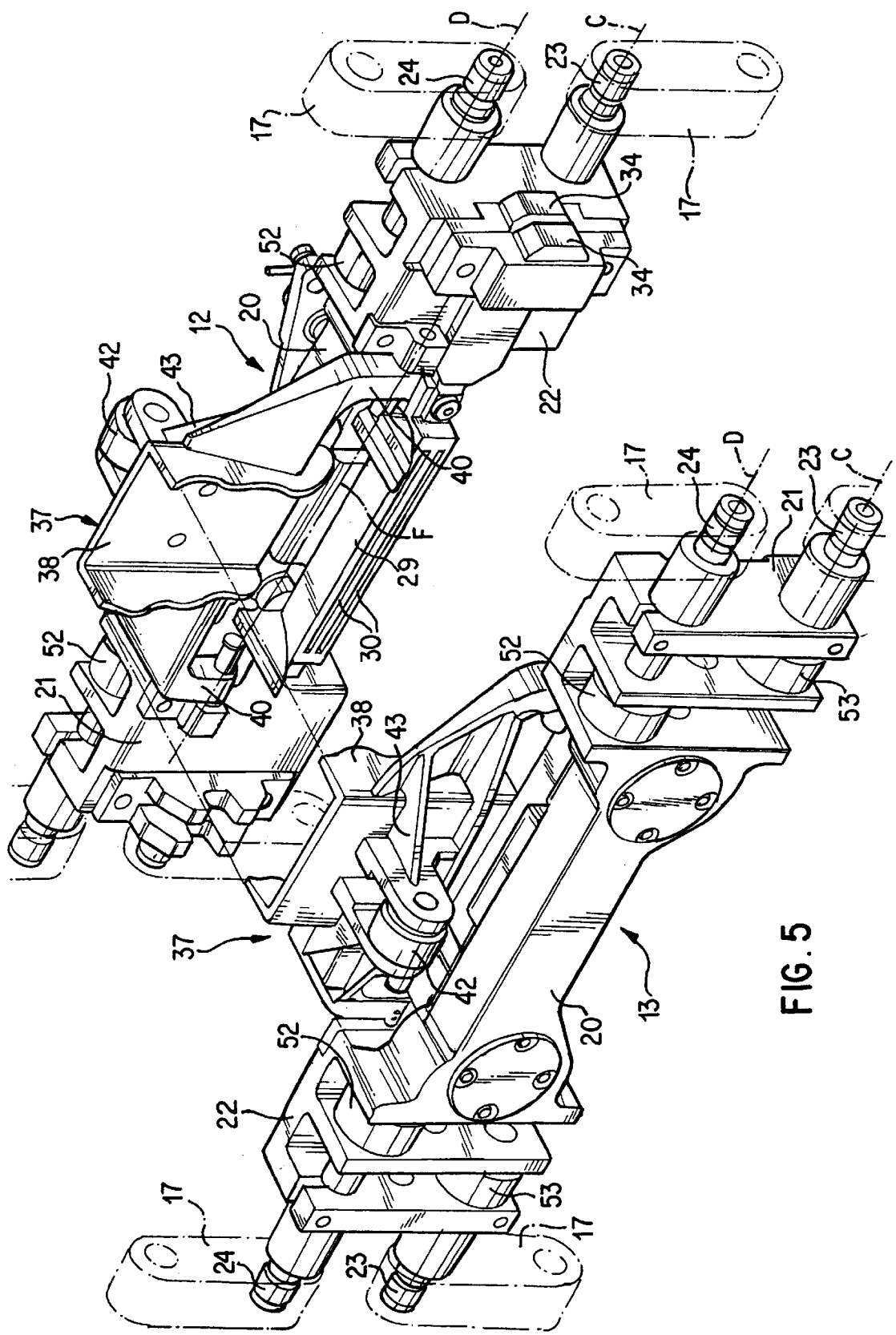
FIGS. 5 and 6 show larger-scale views in perspective, from opposite sides, of a jaw and corresponding counter-jaw of the FIG. 2 forming assembly.
Figure 6:
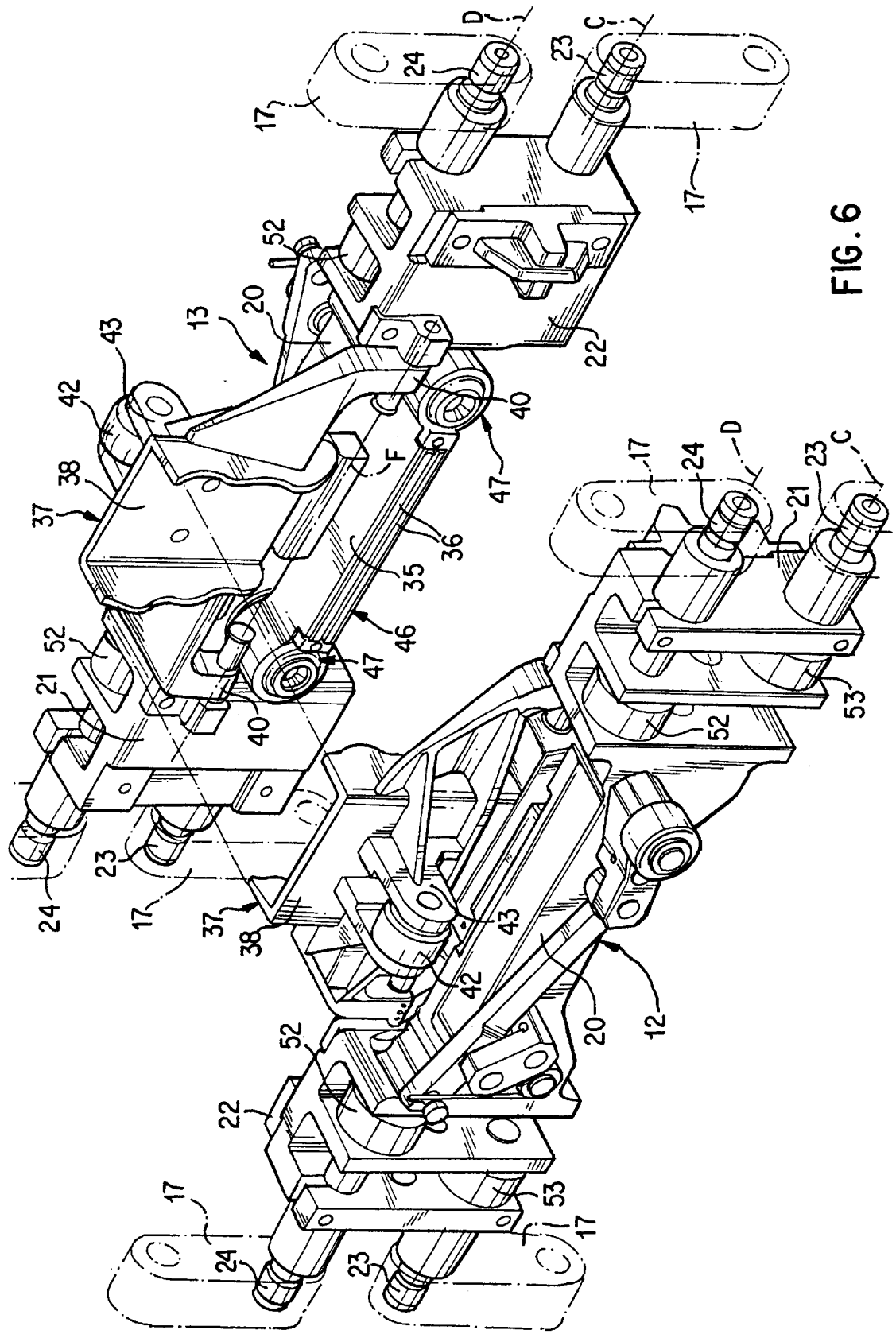

With particular reference to FIGS. 5, 6, jaws 12 and counter-jaws 13 each comprise a respective control device 37 for controlling the volume of package 2 as it is being formed. Each device 37—not forming part of the present invention, and therefore not described in detail—substantially comprises a half shell 38 hinged to main body 20 about an axis F parallel to axes C, D by two lateral supporting brackets 40 integral with half shell 38, which cooperates frontally with a complementary half shell to form a cavity housing package 2 as it is being formed. Each device 37 also comprises a cam follower roller 42 fitted idly to a supporting bracket 43 extending integrally from the rear of respective half shell 38.

Cam followers 42 of jaws 12 and counter-jaws 13 cooperate with respective cams 44 fitted to walls 6 and 7 of frame 3, and of which only the one relative to conveyor 11 is shown in FIG. 1. Briefly, the profiles (shown only partly) of cams 44 are so shaped as to close half shells 38 along portions P1, Q1 of paths P, Q, to keep half shells 38 contacting each other along portions P2, Q2 of paths P, Q, and to open half shells 38 along portions P3, Q3 of paths P, Q.

Figure 3:
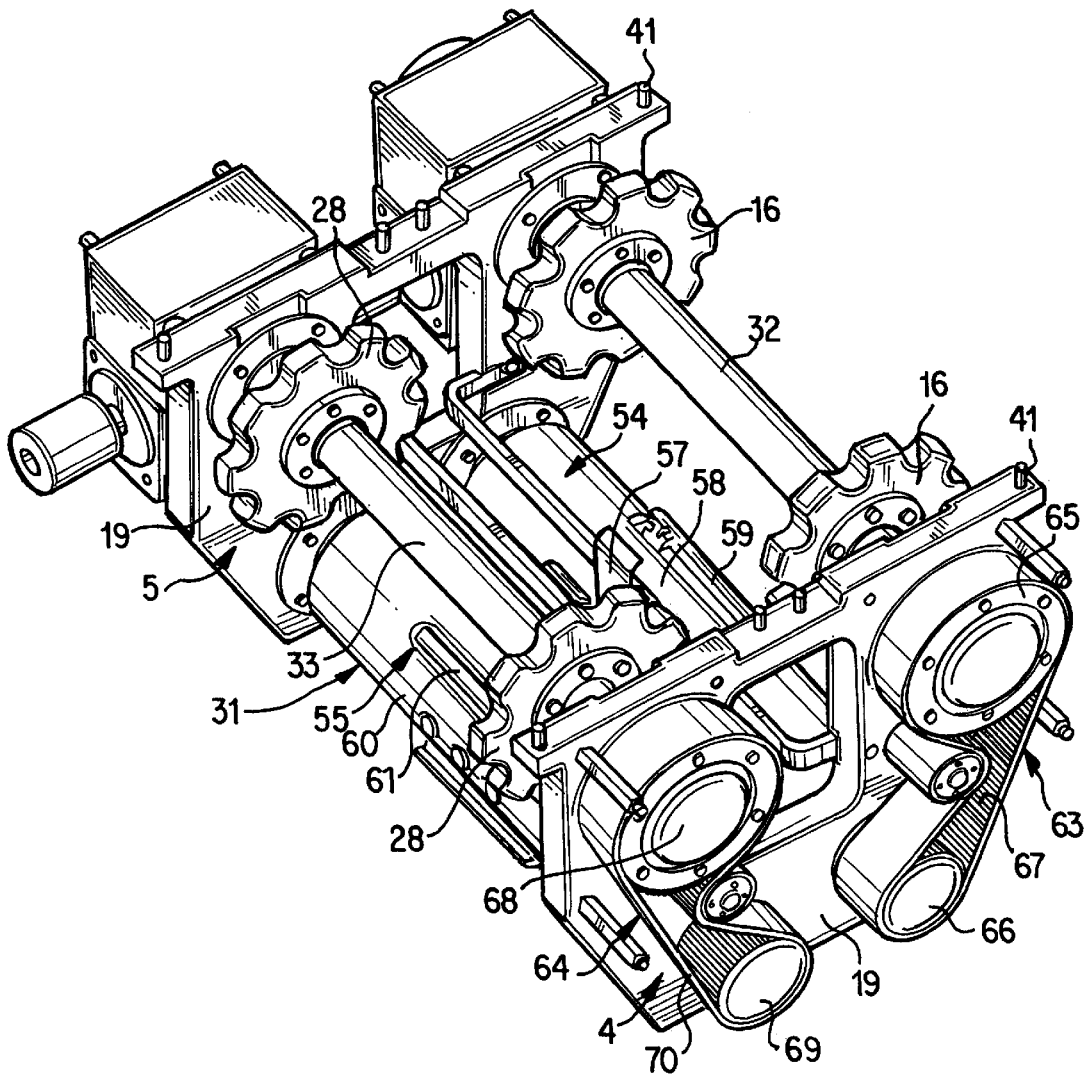
FIG. 3 shows a larger-scale view in perspective of a cutting assembly of the FIG. 1 unit.
Figure 4:
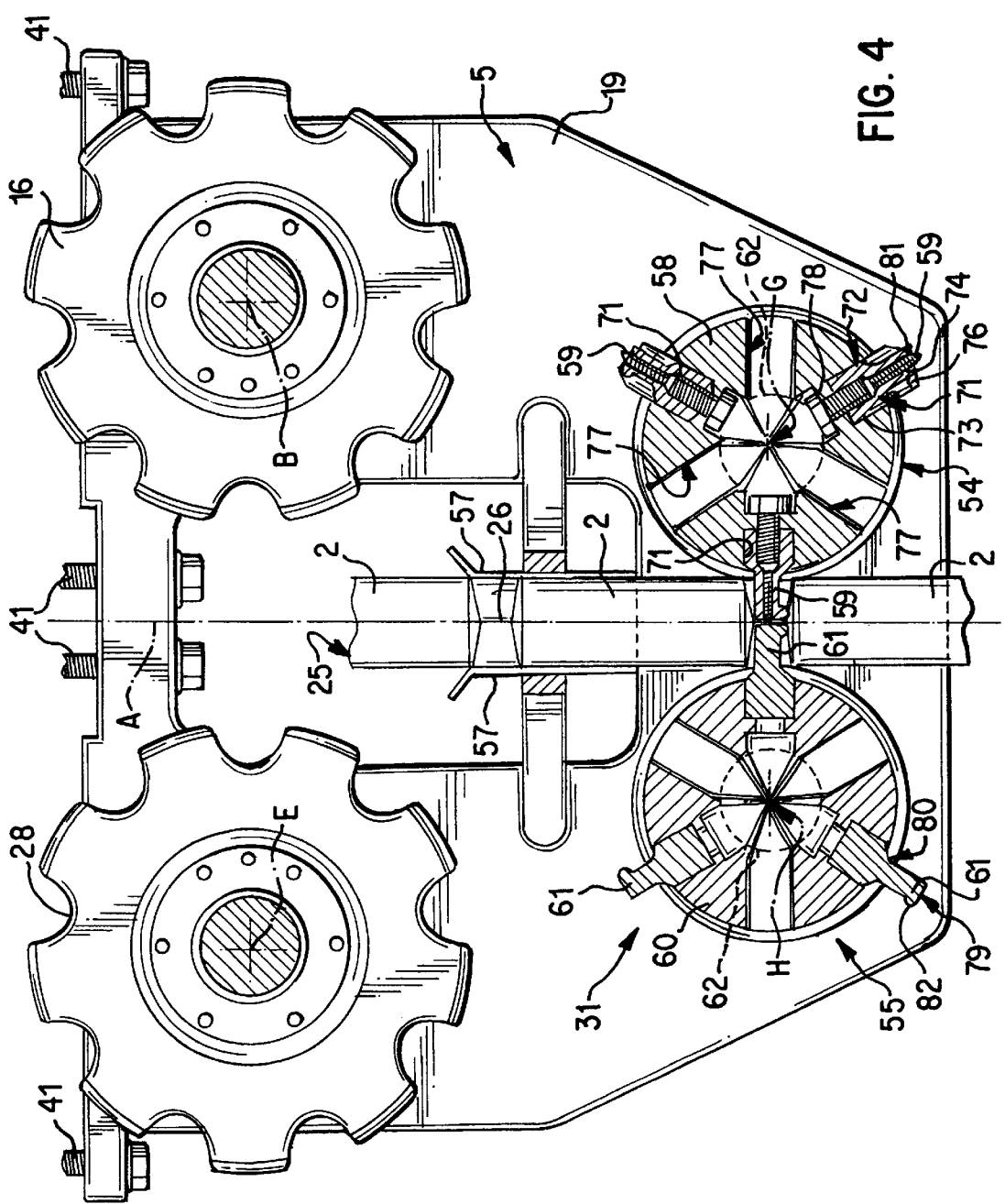
FIG. 4 shows a larger-scale, partially sectioned side view of the FIG. 3 cutting assembly.

With reference to FIGS. 3 and 4, according to an important characteristic of the present invention, assembly 31 comprises a pair of cutting members 54, 55 fitted between plates 19 of side walls 4, 5, located symmetrically on opposite sides of path A, rotating synchronously and in opposite directions about respective axes G, H perpendicular to path A and to plates 19, and cooperating with strip 25 of packages 2 at a surface speed substantially equal to and concordant with the traveling speed of strip 25 to cut it along bands 26 in such a manner as to detach packages 2 and draw them away from chain conveyors 10, 11.

The strip 25 of packages 2 coming off conveyors 10, 11 is fed to cutting members 54, 55 between two guide walls 57 facing each other along path A, and which are fitted to frame 3 and extend crosswise to side walls 4, 5.

Cutting member 54 comprises a drum 58 of axis G, fitted in angularly rotating manner to plates 19 of side walls 4, 5; and a number of substantially flat blades 59— three in the example shown—fitted to, and projecting radially from the outer periphery of, drum 58.

Similarly, cutting member 55 comprises a drum 60 of axis H, fitted in angularly rotating manner to plates 19 of side walls 4, 5; and, as opposed to blades 59, a number of blocks 61—three in the example shown—fitted to drum 60, projecting radially from the outer periphery of drum 60, and defining respective gripping elements (described later on) for gripping strip 25, and respective contrast elements for corresponding blades 59 when cutting bands 26 of strip 25 of packages 2. As described later on, blocks 61, together with corresponding blades 59, also provide for drawing each package 2 away from conveyors 10, 11.

More specifically, in the cutting position, each blade 59 and corresponding block 61 are horizontal and perpendicular to path A, cooperate on opposite sides with a respective band 26, and interfere slightly with each other to ensure sufficient cutting pressure.

Each drum 58, 60 is connected to plates 19 of side walls 4, 5 by a pair of pins 62 (only one shown by the dotted line in FIG. 4) extending coaxially from opposite ends of the drum, engaging in rotary manner respective through holes (not shown) formed in plates 19, and projecting outwards with respect to plates 19.

Drums 58, 60 are driven synchronously by shafts 32, 33 of wheels 16, 28 via respective toothed-belt transmissions 63, 64 (FIG. 3).

Transmission 63 comprises a drive pulley 65 fitted to the end portion of shaft 32 projecting outwards of side wall 4; a driven pulley 66 fitted to a respective end pin 62 of drum 58; and a toothed belt 67 looped about pulleys 65, 66.

Similarly, transmission 64 comprises a drive pulley 68 fitted to the end portion of shaft 33 projecting outwards of side wall 4; a driven pulley 69 fitted to a respective end pin 62 of drum 60; and a toothed belt 70 looped about pulleys 68, 69.

With reference to FIG. 4, blades 59 are elongated in the direction of axis G, and are fitted radially to drum 58 by respective supporting elements 71. More specifically, drum 58 comprises, outwards, three slots 72 equally spaced about axis G, elongated in a direction parallel to axis G, and each housing a respective supporting element 71, which is also elongated in the direction of axis G.

Each supporting element 71 comprises a base portion 73 fitted inside respective slot 72 by a pair of screws (not shown); and an end portion 74 extending radially from portion 73, projecting outwards from drum 58, and having an elongated seat for housing respective blade 59. More specifically, each blade 59 is fitted in radially adjustable manner inside said seat in respective supporting element 71 by a pair of bolts 76 (only one shown) engaging respective through slots (not shown) in blade 59.

Drum 58 also comprises at least three equally spaced radial holes 77 intersecting one another at axis G of drum 58, communicating with respective slots 72, and for permitting the insertion inside drum 58 of respective pressure screws 78. More specifically, according to a preferred embodiment, each screw 78 engages a respective threaded hole formed in portion 73 of respective supporting element 71, and, at one end, cooperates with and pushes against respective blade 59, after first loosening bolts 76, to vary the distance between blade 59 and axis G of drum 58, and so adjust the interference with respective block 61 and the cutting pressure. Alternatively, the above adjustment may be made differently, e.g. by adjusting the position of supporting element 71 to which respective blade 59 is fitted.

Like blades 59, blocks 61 are elongated in the direction of axis H, are fitted radially to drum 60 by respective pairs of screws (not shown), and comprise, at the free ends, respective flat contrast surfaces 79 designed to cooperate with respective blades 59. More specifically, drum 60 comprises, outwards, three slots 80 equally spaced about axis H, elongated in a direction parallel to axis H, and each engaged by a respective block 61.

For each blade 59 and each block 61, cutting members 54, 55 also comprise respective engaging elements 81, 82 cooperating with each other to grip strip 25 of packages 2 at a respective band 26 and draw strip 25 along path A into the cutting position. The pulling action exerted by engaging elements 81, 82 on strip 25 is such as to draw package 2 out of the respective jaw and corresponding counter-jaw, and ensure band 26 for cutting is positioned correctly with respect to blade 59 and respective block 61. More specifically, the action of engaging elements 81, 82 ensures each band 26 is cut along a line interposed between the two sealing lines.

The engaging element 81 of each blade 59 comprises a substantially pointed appendix extending integrally and circumferentially from a free radial end of respective supporting element 71; and the engaging element 82 of each block 61 comprises a rounded appendix extending integrally and circumferentially from the free radial end of block 61.

Unit 1 operates as follows.

Conveyors 10, 11 are rotated in opposite directions, as indicated by the arrows in FIG. 2, so that, from the end of portions P1, Q1 of respective paths P, Q and along respective portions P2, Q2, respective jaws 12 and counter-jaws 13 cooperate with tube 14 of packaging material according to a movement defined by the profiles of cams 50, 51.

In the following detailed description of the operating cycle, reference is made to one jaw 12 and respective counter-jaw 13, all the other jaws 12 and counter-jaws 13 obviously performing the same cycle at time intervals depending on the output rate.

Along portions P1 and Q1, jaw 12 and respective counter-jaw 13 are brought together to gradually deform and flatten tube 14 at a transverse band 26.

At the end of portions P1, Q1, devices 37 for controlling the volume of packages 2 are activated, and half shells 38 of jaw 12 and counter-jaw 13 are mated frontally to define, as already stated, a cavity for housing package 2 being formed.

As jaw 12 and counter-jaw 13 reach respective straight portions 50b, 51b of cams 50, 51, at which the maximum gripping pressure is exerted on tube 14, heating element 29 is supplied to heat-seal the packaging material defining band 26.

Downstream from portions 50b, 51b of cams 50, 51, by which time no force is exchanged between jaw 12 and counter-jaw 13, these are detached from the packaging material by drive wheels 16, 28 meshing with pins 23, 24.

The above work cycle results in the formation of a continuous strip 25 of packages 2 joined to one another by bands 26; and strip 25 is fed between guide walls 57 towards cutting members 54, 55.

As drums 58, 60 rotate about respective axes G, H, engaging elements 81, 82 are first brought into contact with a corresponding band 26, which is gripped by engaging elements 81, 82 and drawn along path A into the cutting position wherein band 26 is interposed perfectly between a blade 59 and corresponding block 61, both positioned horizontally, and wherein blade 59 and block 61 interact with band 26 to cut it along a line interposed between the sealing lines.

The pulling action exerted by engaging elements 81, 82 guarantees withdrawal of packages 2 from the respective jaws and corresponding counter-jaws, and ensures each band 26, at the cutting stage, is positioned correctly with respect to blade 59 and corresponding block 61.

The cutting pressure is regulated by adjusting the radial position of blades 59 on drum 58. To do which, each blade 59 and corresponding block 61 are set to the horizontal cutting position; bolts 76 securing blade 59 to respective supporting element 71 are loosened; and, using a torque wrench, pressure screw 78 is adjusted to to adjust the radial position of blade 59.

The advantages of unit 1 according to the present invention will be clear from the foregoing description.

In particular, unlike the known packaging units described previously, cutting members 54, 55 are located along path A, downstream from conveyors 10, 11, so that the structure of jaws 12 is simplified, no control device is required to activate cutting members 54, 55 at a predetermined point in the production cycle, and a cutting element for each jaw 12 is not required (in the example shown, three blades 59 and three blocks 61 are sufficient to perform the cutting operation).

Moreover, in the event of replacement, cutting members 54, 55 are easily removable from unit 1 by simply detaching them from plates 19 of side walls 4, 5, without touching conveyors 10, 11.

Finally, engaging elements 81, 82 (on each blade 59 and corresponding block 61) ensure sealing band 26 of strip 25 of packages 2 is positioned correctly, at the cutting stage, with respect to blade 59 and respective block 61, and ensure packages 2 are withdrawn from the respective jaws and corresponding counter-jaws, and drawn away from chain conveyors 10, 11.

Clearly, changes may be made to unit 1 as described and illustrated herein without, however, departing from the scope of the claims.

We claim:

1. A packaging unit useful for continuously producing aseptic sealed packages, containing a pourable food product, from a tube made of heat-seal packaging material in sheet form and fed along a vertical tube supply path, said tube being filled with said food product, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path each comprising respective work portions adjacent to said tube supply path and extending symmetrically on opposite sides of said supply path, so that said jaws on said first conveyor cooperate with respective counter-jaws on said second conveyor, along at least part of the respective said work portions, to grip said tube at respective equally spaced cross sections;

heating means fitted to at least said jaws and cooperating with said tube to heat-seal the tube at said cross sections and define a strip of packages connected to one another by respective transverse sealing bands;

means attached to said jaws and counter jaws in opposed relationship to cooperatively control the volume of each package as it is being conveyed;

cutting means for cutting said strip of packages along said sealing bands and so detaching said packages, said cutting means comprising a first cutting member and a second cutting member located beneath said conveyors along said tube supply path, said first and second cutting members positioned on opposite sides of the tube supply path, rotating synchronously and in opposite directions about respective first and second axes of rotation crosswise to said tube supply path, and cooperating with said strip of packages to cut the strip of packages along said sealing bands and draw said packages away from said chain conveyors;

a first engaging element connected to said first cutting element;

a second engaging element connected to said second cutting element;

wherein said first engaging element is sized and positioned on said first cutting element and said second engaging element is sized and positioned on said second cutting element so that said first engaging element and said second engaging element cooperate with each other to grip and draw said sealing band along said tube supply path away from said first chain conveyor and away from second chain conveyor.

2. A unit according to claim 1, wherein said first cutting member comprises at least one blade, and said second cutting member comprises at least one block defining a contrast element for said blade when cutting said sealing bands of said strip of packages.

3. A unit according to claim 2, wherein said first engaging element and said second engaging element are associated respectively with said at least one blade and with said at least one block.

4. A unit according to claim 3, wherein said first cutting member comprises a first drum coaxial with said first axis of rotation, rotating about the first axis of rotation, and supporting said at least one blade and said first engaging element, both projecting radially from the outer periphery of the first drum, and wherein said second cutting member comprises a second drum coaxial with said second axis of rotation, rotating about the second axis of rotation, and supporting said at least one block and said second engaging element, both projecting radially from the outer periphery of the second drum.

5. A unit according to claim 4, wherein said first cutting member comprises adjusting means for adjusting the radial position of said at least one blade on said first drum and releasable fastening means for securing said at least one blade to said first drum in the radial position defined by said adjusting means.

6. A unit according to claim 5, wherein said first cutting member comprises at least one supporting element fitted radially to said first drum and having a seat for housing said at least one blade, said releasable fastening means comprising a pair of fastening elements securing said at least one blade to said supporting element, and said adjusting means comprising a pressure member fitted to said first drum and cooperating with said at least one blade to move said at least one blade radially with respect to said supporting element.

7. A unit according to claim 6, wherein said first engaging element comprises a substantially pointed appendix extending integrally and circumferentially from a free radial end of said supporting element.

8. A unit according to claim 4, wherein said second engaging element comprises a rounded-profile appendix extending integrally and circumferentially from a free radial end of said block.

9. A unit according to claim 4, wherein said at least one blade comprises a plurality of blades fitted in angularly equally spaced manner to said first drum and said at least one block comprises a plurality of blocks fitted in angularly equally spaced manner to said second drum.

* * * * *